UNITED STATES PATENT OFFICE.

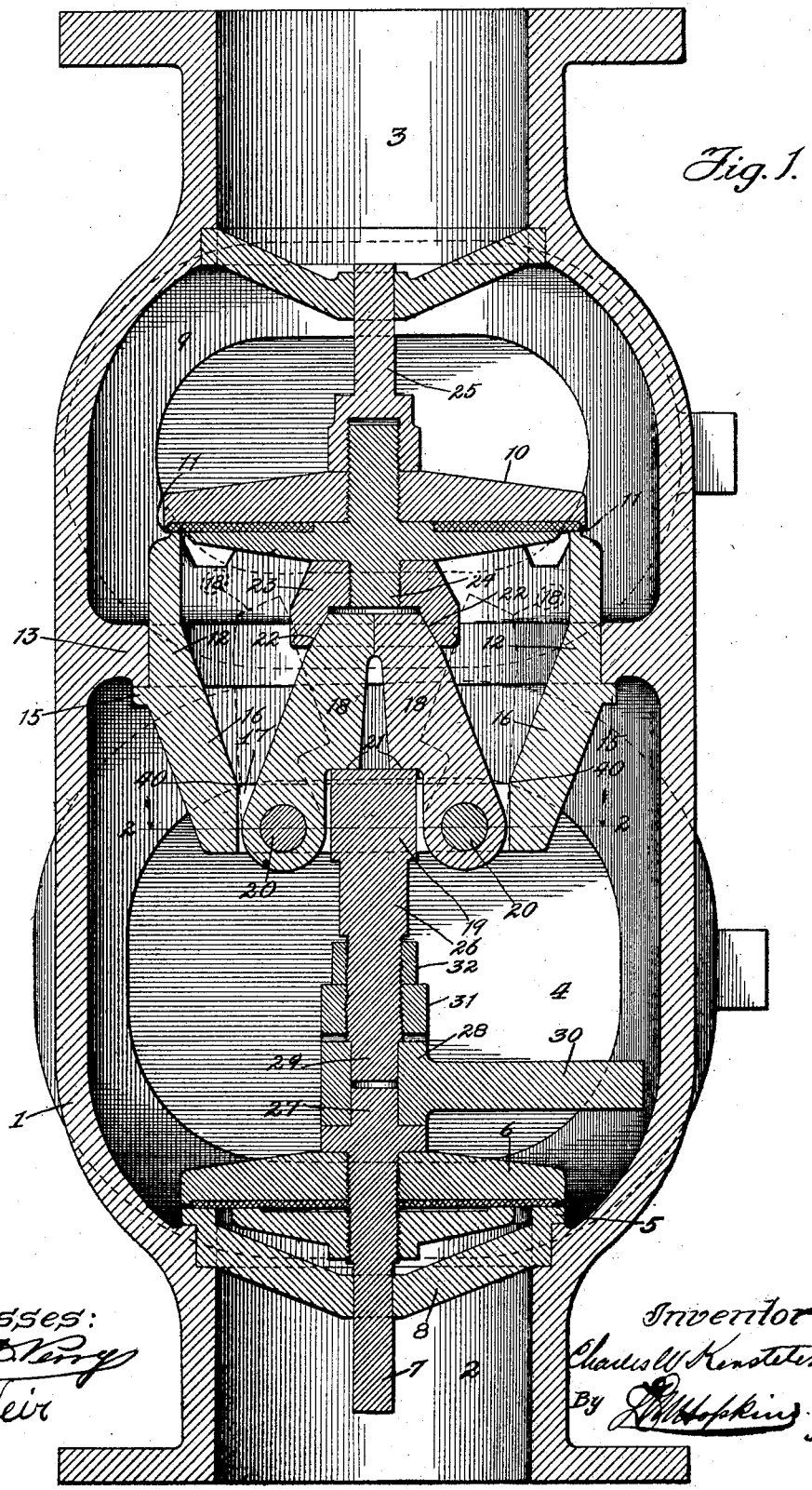

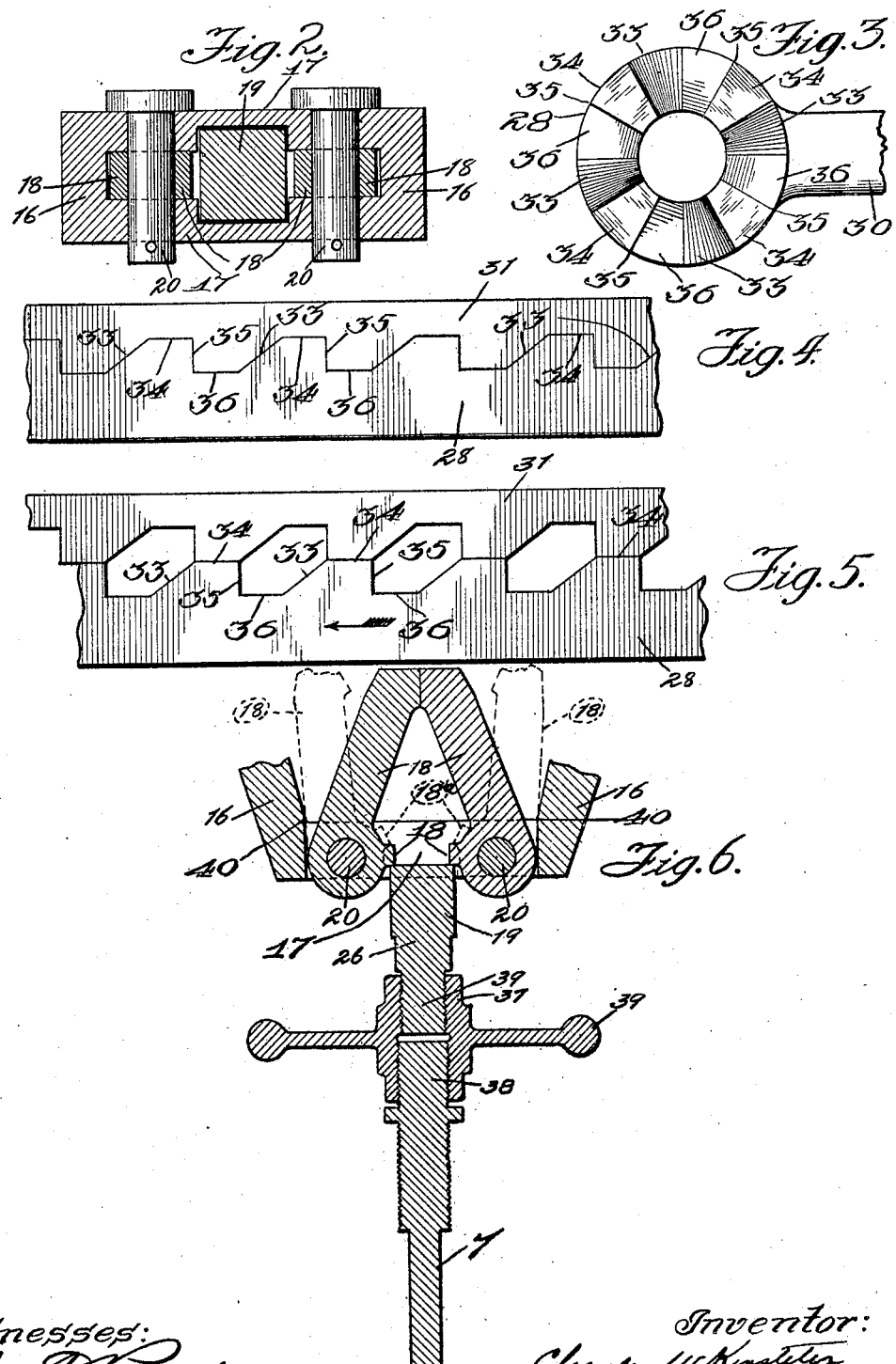

CHARLES W. KERSTETER, OF CHICAGO, ILLINOIS.

VALVE FOR AUTOMATIC FIRE-EXTINGUISHERS.

No. 832,580.     Specification of Letters Patent.     Patented Oct. 2, 1906.

Application filed May 23, 1905. Serial No. 261,791.

*To all whom it may concern:*

Be it known that I, CHARLES W. KERSTETER, a citizen of the United States, residing at Chicago, in the county of Cook and State of Illinois, have invented certain new and useful Improvements in Valves for Automatic Fire-Extinguishers, of which the following is a specification.

The present invention relates to what is known in the art as the "main" valve of a dry-pipe stationary automatic fire-extinguishing system.

The invention relates more particularly to the means through the medium of which the water-valve is held seated by the pressure of the air in the system operating upon the top side of the air-valve. In valves of this type great difficulty is experienced in preventing water-hammer from unseating the water-valve, the unseating of which results in the unseating of the air-valve, with a consequent escape of water past the one and air past the other.

One of the objects of the present invention is to provide means through the medium of which the water-valve is held seated by the air-valve, while at the same time the impulses, which are many times sudden and powerful, are prevented from unseating the valve.

In some valves of the type referred to straining mechanism is incorporated between the water-valve and the air-valve, the object of this straining mechanism being to exert upon the water-valve a sufficient pressure to hold it seated against the pressure of the water beneath it. This straining mechanism reacts indirectly against the air-valve, and hence it is necessary that it be not put under sufficient tension to unseat the air-valve.

Another object of the invention is to provide straining mechanism of such construction that a predetermined tension will always be reached and never can be exceeded in the proper seating of the water-valve.

Another object of the invention is to provide improved means for preventing the air-valve from reseating after once it is fully unseated, the object of this being to prevent columning.

Other objects of the invention will appear hereinafter.

To these ends the invention consists in the features of novelty that are hereinafter described with reference to the accompanying drawings, which are made a part hereof, and in which—

Figure 1 is a vertical central section of a valve embodying the invention in its preferred form. Fig. 2 is a horizontal section of a portion thereof on the line 2 2, Fig. 1, looking downward. Fig. 3 is a face view of one member of the straining mechanism. Figs. 4 and 5 are diagrammatic views of two members thereof. Fig. 6 is a sectional elevation of portions of a valve of modified construction embodying some features of the invention.

The casing 1 may be of any desired construction and is provided with the customary openings or ports 2 and 3, the former for the inlet of water from a suitable source of supply and the latter for the outlet of water to the riser, which supplies the distributing-pipes, said ports being arranged one above the other and with their axes in vertical alinement. The casing has the customary low-pressure chamber 4, which is between the ports 2 and 3 and in vertical alinement therewith and which communicates with the atmosphere through a valved drain-opening. (Not shown in the drawings.) The inlet 2 is surrounded by a seat 5 for the water-valve 6, from the under side of which a guide-stem 7 projects downward and through the central opening of a spider 8, whereby the valve is guided in its movement. The casing has also a chamber 9, which is in open communication with the system, so that its interior is under system pressure. In the chamber 9 is located the air-valve 10, which is adapted to a seat 11, formed on a ring 12, which occupies an opening through a web or partition 13, separating the chambers 4 and 9 and providing a port through which said chambers communicate, which port forms a part of the main waterway and is in vertical alinement with the ports 2 and 3. The ring 12 fits the opening in the web tightly and has an annular shoulder 15, which bears against the under side of the web, and thereby limits the upward movement of the ring.

In addition to carrying the valve-seat 11 the ring carries below the web 13 a yoke comprising a pair of depending arms 16 and a pair of horizontal bars 17. At their outer ends the bars 17 are located a sufficient distance apart to admit between them the lower ends of a pair of levers 18, while the central portions of said bars are far enough apart to admit between them the enlarged rectangular head 19 of a composite strut or stem rising from the water-valve 6. The levers are provided with openings for the passage of fulcrum-pins 20, which pass through them and also through suitable openings in the bars 17. Above their fulcrum-points the levers are provided with shoulders 21, which while the parts are in normal positions are engaged by the head 19. The upper ends of the levers are adapted to come together when permitted to do so by the head 19, and when they are together, or approximately so, they are engaged laterally by the shoulders 22, carried by the air-valve. As shown in the drawings, these shoulders are the results of a frusto-conical socket formed in the under side of a block 23, which has a central threaded opening occupied by a correspondingly-threaded stud 24, projecting downward from the under side of the valve 10. I desire to have it understood, however, that the invention is not limited to the details in the construction of the shoulders, since I believe myself to be the first to provide a valve-holding device having a plurality of levers each having an arm which is substantially parallel with the direction of movement of the air-valve and movable in a direction substantially perpendicular to said direction of movement and means carried by the air-valve and engaging said arms laterally for normally preventing their lateral movement.

It will be seen from an inspection of the drawings that direction of movement of the air-valve is vertical, or in the direction of the axis of its stem 25, and it will be seen also that by reason of the location of the fulcrums of the levers their upper ends move laterally or substantially perpendicularly with respect thereto. To state it differently, the direction of movement of the valve being vertical the levers are upright, by which is meant that they have approximately vertical positions. The frusto-conical form of the socket reduces the resulting shoulders which engage the levers to cam-surfaces. The corresponding portions of the levers are of complementary form, so that when sufficient outward pressure is exerted upon the levers there will be a cam action causing the valve 10 to be lifted from its seat.

It will be observed that there is no direct upward pressure against the air-valve, the only pressure tending to unseat it being the pressure between the engaging cam-surfaces aforesaid. The lifting effect of this pressure upon the valve may be increased or decreased by changing the angle of these cam-surfaces with respect to the centers of movement of the levers. It is manifest that if the cam-surfaces were radial with respect to said centers no amount of pressure upon the levers would have any tendency to lift the valve, while, on the other hand, by increasing the angle the lifting tendency will be correspondingly increased.

The location of the point of engagement between the head 19 and the levers is an important feature of the preferred form of the invention, although in its generic aspect the invention is not limited thereto, but, on the contrary, includes other dispositions of said points of engagement. In the preferred form the shoulders 21 are located between the fulcrums of the levers and their points of engagement with the air-valve, so that the pressure of the head 19 upon said shoulders produces upon the levers pulling strains which are in direction away from their fulcrums and in the general direction of the length of the levers. In this arrangement the levers act as stirrups and transmit the strains to their fulcrums, through the medium of which said strains are largely taken up by the immovable abutments afforded by the bars 17, the remainder of the strains being transmitted through the levers to the shoulders 22.

The strut or stem already referred to is preferably made up of a rod 26, on which the head 19 is formed, a cylindrical stud 27 rising from the valve, and straining mechanism for forcing the rod 26 and the stud 27 the desired distance apart. This straining mechanism has a sleeve 28, having a circular opening for receiving the stud 27 and the unthreaded extremity 29 of the rod 26, so that it may turn freely upon them, said sleeve being preferably provided with a laterally-projecting handle 30 for convenience in turning it. The upper end of the sleeve 28 engages the lower end of a second sleeve 31, which has threaded engagement with the rod 26, so as to be adjustable thereon, a lock-nut 32 being provided for holding it to its adjustment. The meeting faces of the sleeves 28 and 31 have complementary and ratchet teeth comprising alternating flat surfaces and cam-surfaces, as shown diagrammatically in Figs. 4 and 5. These figures are intended to represent portions of the peripheries of the sleeves 28 and 31 as they would appear if laid out flat. It will be seen that the sleeve 28 has in the order named an inclined or cam surface 33, a flat surface 34 at the upper end of said cam-surfaces, a vertical surface 35 extending downward from the surface 34, a flat surface 36, a second cam-surface 33, a second flat surface 34, &c., and that the sleeve 31 has surfaces complementary thereto. The lines bounding these surfaces are radial, as shown in Fig. 3, so that disregarding the surfaces 35 the face of each of said sleeves comprises four inclined or cam surfaces, four low flat surfaces, and four high flat surfaces. The positions of these surfaces before the strain is exerted are shown in Fig. 4. By giving the sleeve 28 a quarter-turn the parts will be brought to the positions shown in Fig. 5. In bringing them to these positions the stud 27 and rod 26 are separated to the extent of the height of the cam-surfaces, and this is the maximum extent to which they can be separated. Hence it is impossible to produce an excessive strain which would tend to unseat the air-valve 10.

As above stated, the invention in its generic aspect is not limited to levers of the precise construction shown in Fig. 1, and in Fig. 6 I have shown an arrangement in which the levers are provided with short horizontal arms 18$^a$, the lower sides of which are preferably radial with respect to the centers of movement and are engaged by the top of the head 19. In this figure I have also shown a modification of the straining mechanism. As here shown, it consists of a coupling-sleeve 37, having right and left threads engaging corresponding threads on a stud 38, projecting upward from the valve 6, and the threaded lower end 39 of the rod 26, the coupling-sleeve being provided with a hand-wheel 39$^a$ for convenience in turning it.

The operation of the two forms of the invention is substantially the same. In both instances while the parts are in normal positions the air-valve will be held seated by the pressure of the air against its upper side, and while seated the shoulders 22, engaging the upper ends of the levers 18, will prevent them from moving laterally. While they are prevented from moving laterally, their shoulders 21 (or their arms 36) will be held in contact with the head 19 and acting through the intervening composite stem or strut will hold the water-valve 6 to its seat; but upon a reduction of the pressure in the system the resistance which the valve offers to the lateral movement of the levers will become insufficient to restrain them, and when this takes place the pressure of the water against the under side of the valve 6 will force it upward and through the medium of the composite strut or stem will move the levers laterally. The engaging cam-surfaces on the levers and air-valve will cause the air-valve to be unseated. The continued upward movement of the composite stem or strut will move the levers outward to the positions indicated by dotted lines. When in these positions, they will be in engagement with stops 40, and while in these positions their upper ends will lie in the path of the block 23, so as to prevent the reseating of the valve 10.

A peculiarity of the valve which forms the subject of the present invention is that the air-valve is wholly relieved of any direct pressure from the water-valve or the interposed connections and that the only tendency of the water-valve to produce pressure upon the air-valve tending to unseat it is due to the cam action resulting from the lateral movement of the upper ends of the levers 18, this lateral movement being substantially perpendicular to the stems of the valves, or, to state it differently, substantially perpendicular to the direction of movement of the alined valves and their stems, or, to state it still differently, substantially parallel with the faces of the valves themselves. It will be observed that the levers are disposed side by side in similar relations to the valves and their accessories, excepting that they of course occupy different positions radially with respect to the vertical center of the entire structure, including the casing, the ports, the valves, and the valve-stems. As to its vertical center they are disposed at equidistant radial positions, so that all tendency to unequal lateral strains upon the air-valve is obviated. I desire to have it understood, however, that, as before intimated, I believe myself to be the first to provide a valve device with a plurality of levers each having an arm disposed in substantial alinement with the stem or stems of the valve or valves proper and with the direction of valve movement, or, in other words, in the general direction of the vertical center of the valve device as a whole, said arms being movable laterally with respect to said center and being engaged by a shoulder or shoulders carried by the air-valve, so that a comparatively light pressure on the top of the air-valve will prevent the lateral movement of said arms.

I am aware that it has heretofore been proposed to provide a lever upon one arm of which the air-valve bears downward in a substantially vertical direction and to interpose between the other arm of this lever and the water-valve mechanism for holding the latter seated; but I desire to draw a distinction between a lever having an arm upon which the air-valve bears downward in a direction which is substantially vertical and which is also substantially at right angles to said arm and a lever having an arm which is substantially parallel with the direction of movement of the air-valve, or, in other words, which in actual practice is substantially vertical and with which a shoulder on the air-valve contacts laterally. The distinction is a substantial one and constitutes one of the essential novel characteristics of the invention forming the subject of the present application. In the preferred form of the invention two levers are used, said levers being arranged side by side and with their fulcrums so close to the vertical center of the valve device as a whole that the pressure of the stem of the water-valve is in a direction which is substantially parallel with lines drawn from the fulcrums of the levers to their points of contact with the air-valve. With this arrangement and disposition of the parts the levers act after the manner of stirrups, the strains put upon them by the pressure of the water-valve being in directions which are substantially or approximately away from said fulcrums and substantially or approximately parallel with their arms, which contact with the air-valve.

What I claim as new, and desire to secure by Letters Patent, is—

1. In a device of the class described the combination with the air-valve and the water-valve, of a pair of substantially vertical levers having arms disposed side by side and movable laterally with respect to the direction of the movement of the air-valve, means carried by the air-valve and engaging said arms for normally preventing their lateral movement, and means interposed between said levers and the water-valve for holding the latter seated, substantially as described.

2. In a device of the class described, the combination with the air-valve and the water-valve, of mechanism for holding the water-valve seated, said mechanism including a lever having an arm disposed in the general direction of the movement of the air-valve and movable laterally with respect to said direction, a shoulder carried by the air-valve and directly engaging said arm, laterally, for preventing its lateral movement, and a rigid stem interposed between the water-valve and the lever, substantially as described.

3. In a device of the class described, the combination with the air-valve and the water-valve, of mechanism for holding the water-valve seated, said mechanism including a lever having an arm disposed in the general direction of movement of the air-valve and movable in a direction substantially perpendicular to the direction aforesaid, means carried by the air-valve and engaging said arm for preventing its lateral movement, and a stem interposed between the water-valve and the lever and engaging the latter at a point between its fulcrum and its contact with the air-valve, substantially as described.

4. In a device of the class described, the combination, with the air-valve and the water-valve, of mechanism for holding the water-valve seated, said mechanism including a lever having an arm disposed in the general direction of the movement of the air-valve and movable in a direction substantially perpendicular to the direction aforesaid, a shoulder on the air-valve engaging said arm, the engaging faces of said shoulder and arm being cam-shaped, and means interposed between the lever and the water-valve, substantially as described.

5. In a device of the class described, the combination, with the air-valve and the water-valve, of mechanism for holding the water-valve seated, said mechanism including a plurality of levers having arms disposed in the general direction of the movement of the air-valve and disposed at equal distances apart, said arms being movable in directions substantially perpendicular to the direction of movement of the air-valve, means carried by the air-valve and engaging said arms for preventing their lateral movement, and means interposed between said levers and the water-valve, substantially as described.

6. In a device of the class described the combination with the air-valve and the water-valve of mechanism for holding the water-valve seated, said mechanism including a pair of levers having arms movable laterally with respect to the direction of movement of the air-valve, a circular shoulder carried by the air-valve and engaging said arms for normally preventing their lateral movement and means interposed between said levers and the water-valve for holding it seated, substantially as described.

7. In a device of the class described the combination with the air-valve and the water-valve of mechanism for holding the water-valve seated, said mechanism including a pair of levers having arms arranged side by side and in the general direction of the movement of the air-valve, said arms being movable laterally with respect to the direction of movement of the air-valve, means carried by the air-valve and engaging said arms for normally preventing their lateral movement and a stem or strut interposed between said levers and the water-valve, substantially as described.

8. In a device of the class described the combination with the air-valve and the water-valve of mechanism for holding the water-valve seated, said mechanism including a pair of levers having arms arranged side by side and in the general direction of the movement of the air-valve, said arms being movable laterally with respect to the direction of movement of the air-valve, means carried by the air-valve and engaging said arms for normally preventing their lateral movement and a stem or strut engaging said levers and the water-valve, said stem or strut being adjustable in length, substantially as described.

9. In a device of the class described the combination with the air-valve and the water-valve of mechanism for holding the water-valve seated, said mechanism including a pair of levers having arms arranged side by side and in the general direction of the movement of the air-valve, said arms being movable laterally with respect to the direction of movement of the air-valve, means carried by the air-valve and engaging said arms for normally preventing their lateral movement, means interposed between said levers and the water-valve and stops for arresting the levers in positions to prevent the reseating of the air-valve, substantially as described.

10. In a device of the class described the combination with the air-valve and the water-valve of mechanism for holding the water-valve seated, said mechanism including a composite stem or strut having two parts and means for moving them endwise relatively to each other, said means comprising two relatively movable parts having alternating cam-surfaces and flat surfaces, substantially as described.

11. In a device of the class described the combination with the air-valve and the water-valve of mechanism for holding the water-valve seated, said mechanism including a strut or stem, said strut or stem comprising two parts, and straining mechanism for forcing them apart, said straining mechanism having a collar on one of said parts and a second collar rotatively mounted on both of said parts, the engaging faces of said collars being complementary and having alternating cam-surfaces and flat surfaces, substantially as described.

12. In a device of the class described the combination with the air-valve and the water-valve of mechanism for holding the water-valve seated, said mechanism including a pair of levers having arms movable laterally with respect to the direction of movement of the air-valve, means carried by the air-valve and engaging said arms for normally preventing their lateral movement and a stem engaging the water-valve and engaging the levers at points between their fulcrums and their points of engagement with the air-valve, substantially as described.

13. In a device of the class described, the combination with a casing having a chamber and having vertically-alined ports leading into and out of said chamber, of valves adapted to said ports, a lever having a substantially vertical arm, the upper end of which is movable in a substantially horizontal direction, means carried by the upper valve and engaging said arm for preventing the horizontal movement of its upper end, and means interposed between said lever and the lower valve for holding the latter seated, substantially as described.

14. In a device of the class described, the combination with a casing having a chamber and having vertically-alined ports leading into and out of said chamber, of valves adapted to said ports respectively, a plurality of levers having substantially vertical arms, the upper ends of which are movable in substantially horizontal directions, means carried by the upper valve and engaging said arms for preventing the horizontal movement of their upper ends, and means interposed between the levers and the lower valve for holding the latter seated, substantially as described.

15. In a device of the class described, the combination with a casing having a chamber and having vertically-alined ports leading into and out of said chamber, valves adapted to said ports respectively, a lever having a substantially vertical arm, the upper end of which is movable in a substantially horizontal direction, said arm having a shoulder, means carried by the upper valve and engaging said arm for preventing the horizontal movement of its upper end, and a strut interposed between said shoulder and the lower valve, for holding the latter seated, substantially as described.

16. In a device of the class described, the combination with a casing having a chamber and having vertically-alined ports leading into and out of said chamber, of valves adapted to said ports, a plurality of levers having arms occupying substantially vertical positions, means carried by the upper valve and engaging said arms for preventing the horizontal movement of their upper ends, and a vertical stem interposed between said levers and the lower valve, substantially as described.

17. In a device of the class described, the combination with a casing having vertically-alined ports, of valves adapted to said ports, a plurality of levers disposed at substantially equal angles to the central line common to the axes of said ports, and substantially parallel with said line, means on the upper valve engaging said arms for preventing their lateral movement and means interposed between the levers and the lower valve for holding the latter seated, substantially as described.

CHARLES W. KERSTETER.

Witnesses:
H. M. PULSIFER,
L. M. HOPKINS.